US010541405B2

(12) United States Patent
Hoshino

(10) Patent No.: US 10,541,405 B2
(45) Date of Patent: *Jan. 21, 2020

(54) POWER STORAGE APPARATUS

(71) Applicant: NGK Inhibitors, Ltd., Nagoya-Shi (JP)

(72) Inventor: Koji Hoshino, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 294 days.

This patent is subject to a terminal disclaimer.

(21) Appl. No.: 14/639,544

(22) Filed: Mar. 5, 2015

(65) Prior Publication Data
US 2015/0180017 A1 Jun. 25, 2015

Related U.S. Application Data

(63) Continuation of application No. PCT/JP2013/075161, filed on Sep. 18, 2013.

(30) Foreign Application Priority Data

Sep. 25, 2012 (JP) ................. 2012-211217

(51) Int. Cl.
H01M 2/34 (2006.01)
H01M 2/20 (2006.01)
H01M 2/10 (2006.01)

(52) U.S. Cl.
CPC ......... *H01M 2/348* (2013.01); *H01M 2/1077* (2013.01); *H01M 2/204* (2013.01); *H01M 2/206* (2013.01); H01M 2200/00 (2013.01)

(58) Field of Classification Search
CPC .................................. H01M 2/1077
See application file for complete search history.

(56) References Cited

U.S. PATENT DOCUMENTS

| 8,603,663 | B2 | 12/2013 | Park et al. |
| 8,615,869 | B2 | 12/2013 | Chattot |
| 2008/0220319 | A1 | 9/2008 | Takagi et al. |
| 2011/0014512 | A1 | 1/2011 | Amagai et al. |
| 2011/0287298 | A1 | 11/2011 | Park et al. |
| 2011/0302773 | A1 | 12/2011 | Chattot |
| 2012/0100400 | A1* | 4/2012 | Kang ............. H01M 2/1077 429/7 |
| 2012/0183823 | A1* | 7/2012 | Von Borck ........ H01M 2/1061 429/81 |
| 2013/0216874 | A1* | 8/2013 | Endo .................. H01M 2/1016 429/83 |
| 2013/0295428 | A1 | 11/2013 | Hatta et al. |
| 2014/0333238 | A1 | 11/2014 | Yokoyama |

FOREIGN PATENT DOCUMENTS

| CN | 102255064 A | 11/2011 |
| EP | 2 159 862 A1 | 3/2010 |
| JP | 2001-243938 A1 | 9/2001 |
| JP | 2006-351311 A1 | 12/2006 |
| JP | 2008-226488 A1 | 9/2008 |
| JP | 2008-276991 A1 | 11/2008 |
| JP | 2009-231267 A1 | 10/2009 |
| JP | 2011-071011 A1 | 4/2011 |
| WO | 01/73914 A2 | 10/2001 |
| WO | 2008/035873 A1 | 3/2008 |
| WO | 2010/061063 A1 | 6/2010 |
| WO | 2012/105137 A1 | 8/2012 |
| WO | 2013/118874 A1 | 8/2013 |

OTHER PUBLICATIONS

Chinese Office Action (Application No. 201380047614.9) dated Jun. 21, 2016.
Extended European Search Report (Application No. 13842556.6) dated Apr. 21, 2016.
International Search Report and Written Opinion (Application No. PCT/JP2013/075161) dated Nov. 12, 2013.

* cited by examiner

*Primary Examiner* — Ladan Mohaddes
(74) *Attorney, Agent, or Firm* — Burr & Brown, PLLC

(57) ABSTRACT

Two or more series-connected sets are arranged in a vertical direction and connected in series through an interstage wire. Each of the two or more series-connected sets includes two or more module batteries that are arranged in a horizontal direction and connected in series through an intrastage wire. The main pole feedthrough part penetrates through a side wall of the container. The main pole terminal is disposed outside the case. An insulator of the main pole supporter insulates a first coupling part and a second coupling part from each other. The first coupling part is coupled to the base, and the second coupling part is coupled to the main pole terminal. The two or more cells are housed in an accommodation space and charged and discharged via the main pole.

6 Claims, 14 Drawing Sheets

F I G. 2
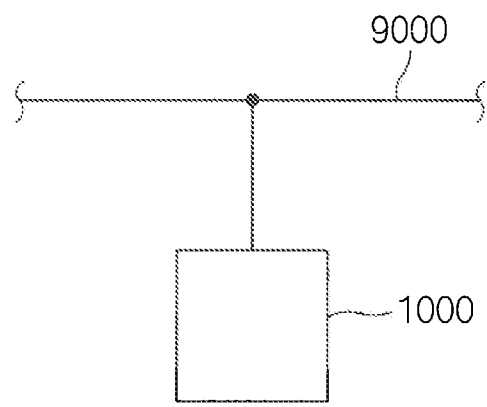

POWER STORAGE APPARATUS

TECHNICAL FIELD

The present invention relates to a power storage apparatus.

BACKGROUND ART

Power storage apparatuses have two or more module batteries arranged in an array and connected through wiring. For example, Patent Literature 1 discloses a power storage apparatus that includes 40 module batteries arranged in an array, and in which each five of the module batteries arranged in the up-down direction are connected through interstage wires.

PRIOR ART LITERATURE

Patent Literature

Patent Literature 1: Japanese Patent Application Laid-Open No. 2008-226488

SUMMARY OF SAID INVENTION

Problems to be Solved by the Invention

In the power storage apparatus of Patent Literature 1, a large number of interstage wires run close by the space between the container and the lid. In the case of combustion of a module battery, flames or high-temperature substances will belch out of the space between the container and the lid. Thus, the wires in the power storage apparatus of Patent Literature 1 can be easily affected by the combustion of module batteries, and in such a case, it is difficult to maintain insulation of the wires.

The present invention has been achieved in light of such a problem. It is an object of the present invention to improve the safety of a power storage apparatus.

Means for Solving the Problems

The present invention is directed to a power storage apparatus.

In a first aspect of the present invention, two or more series-connected sets are arranged in a vertical direction and connected in series through an interstage wire. Each of the two or more series-connected sets includes two or more module batteries that are arranged in a horizontal direction and connected in series through an intrastage wire.

Each of the two or more module batteries includes a case, a base, a main pole, a main pole supporter, and two or more cells.

The case has an accommodation space therein. The case includes a container and a lid. The container has a side wall and an opening. The opening faces upward in the vertical direction and is closed by the lid. The case is placed on the base.

The main pole includes a main pole feedthrough part and a main pole terminal.

The main pole feedthrough part penetrates through the side wall. The main pole terminal is disposed outside the case.

The main pole supporter includes an insulator, a first coupling part, and a second coupling part. The insulator insulates the first coupling part and the second coupling part from each other. The first coupling part is coupled to the base, and the second coupling part is coupled to the main pole terminal.

The two or more cells are housed in the accommodation space and charged and discharged via the main pole.

A second aspect of the present invention provides an additional feature with the first aspect of the present invention.

In the second aspect of the present invention, the intrastage wire includes a flexible conductor. The surface of a connecting part of the main pole terminal and the surface of a connecting part of the flexible conductor are nickel plated.

Each of the two or more series-connected sets includes a tightening mechanism. The tightening mechanism tightens the connecting part of the main pole terminal and the connecting part of the flexible conductor.

A third aspect of the present invention provides an additional feature with the second aspect of the present invention.

In the third aspect of the present invention, a first voltage measuring wire is coupled to the main pole terminal, and a second voltage measuring wire is coupled to the flexible conductor.

A fourth aspect of the present invention provides an additional feature with the second or third aspect of the present invention. In the fourth aspect of the present invention, the tightening mechanism includes a bolt and a nut. The nut is screwed on the bolt.

A distance from the side wall of the container to the connecting part of the main pole terminal is longer than a bolt length of the bolt, and is longer than a distance from the side wall of the container to a proximity part of the main pole terminal. The proximity part of the main pole terminal is coupled to the main pole feedthrough part.

Advantageous Effects of the Invention

According to the first aspect of the present invention, a small number of wires that run close by the space between the container and the lid makes it harder for the wires to be affected by the combustion of module batteries. The wires are also hard to fall off even if they are affected by the combustion of module batteries, and thus can maintain their insulation. This improves the safety of the power storage apparatus.

According to the second aspect of the present invention, it is possible to increase durability and heat resistance of connection between the main pole terminal and the flexible conductor.

According to the third aspect of the present invention, the resistance of the connection between the main pole terminal and the flexible conductor can be measured. This enables easy detection of failures in contact between the main pole terminal and the flexible conductor.

According to the fourth aspect of the present invention, the main pole feedthrough part can be shortened. This inhibits absorption and emission of heat via the main pole feedthrough part, facilitates adjustment of the temperature in the accommodation space, and makes it easy to keep the bolt away from contact with the side wall.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a schematic diagram illustrating an example of use of the power storage apparatus.

EMBODIMENTS FOR IMPLEMENTING THE INVENTION (Overview of Power Storage Apparatus)

Figure 1:
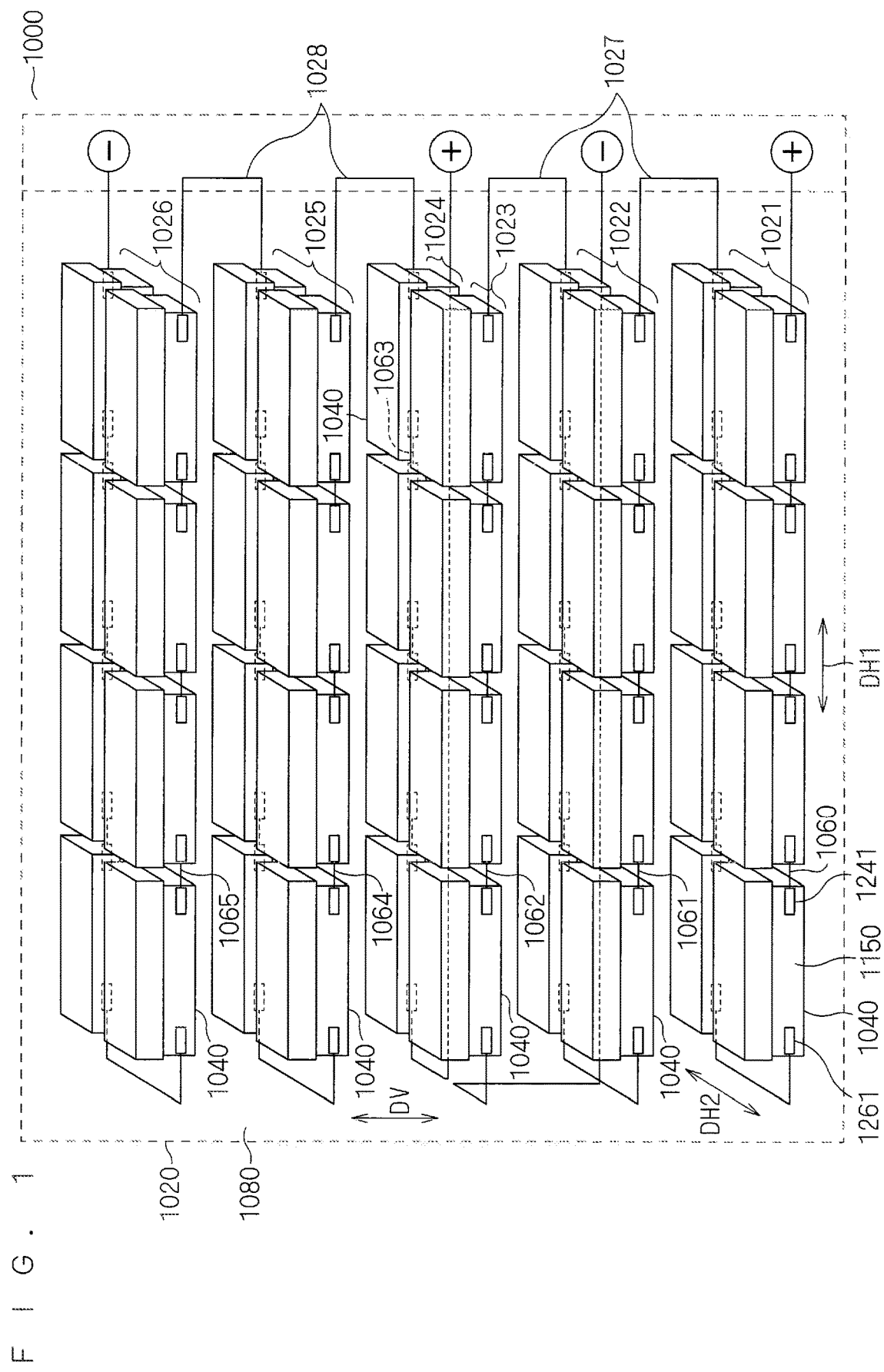
FIG. 1 is a schematic diagram of a power storage apparatus.

A schematic diagram of FIG. 1 illustrates a desirable embodiment of a power storage apparatus.

As illustrated in FIG. 1, a power storage apparatus 1000 includes a housing 1020, a first series-connected set 1021, a second series-connected set 1022, a third series-connected set 1023, a fourth series-connected set 1024, a fifth series-connected set 1025, a sixth series-connected set 1026, a first interstage wire 1027, and a second interstage wire 1028.

The number of series-connected sets included in the power storage apparatus 1000 may increase or decrease. In general, the power storage apparatus 1000 includes two or more series-connected sets.

The first series-connected set 1021 includes eight module batteries 1040 and a first intrastage wire 1060. The second series-connected set 1022 includes eight module batteries 1040 and a second intrastage wire 1061. The third series-connected set 1023 includes four module batteries 1040 and a third intrastage wire 1062. The fourth series-connected set 1024 includes four module batteries 1040 and a fourth intrastage wire 1063. The fifth series-connected set 1025 includes eight module batteries 1040 and a fifth intrastage wire 1064. The sixth series-connected set 1026 includes eight module batteries 1040 and a sixth intrastage wire 1065.

The number of module batteries 1040 included in each of the first to sixth series-connected sets 1021 to 1026 may increase or decrease. In general, each of the first to sixth series-connected sets 1021 to 1026 includes two or more module batteries 1040.

The power storage apparatus 1000 may also include other constituent elements aside from those described above. For example, the power storage apparatus 1000 may include other equipment such as electric power equipment, control equipment, and air conditioning equipment. The electric power equipment includes, for example, an AC-DC converter (PCS), a transformer, a voltage sensor, and a current sensor.

(Connection of Module Batteries)

As illustrated in FIG. 1, the eight module batteries 1040 that belong to the first series-connected set 1021 are electrically connected in series by the first intrastage wire 1060. The eight module batteries 1040 that belong to the second series-connected set 1022 are electrically connected in series by the second intrastage wire 1061. The four module batteries 1040 that belong to the third series-connected set 1023 are electrically connected in series by the third intrastage wire 1062. The four module batteries 1040 that belong to the fourth series-connected set 1024 are electrically connected in series by the fourth intrastage wire 1063. The eight module batteries 1040 that belong to the fifth series-connected set 1025 are electrically connected in series by the fifth intrastage wire 1064. The eight module batteries 1040 that belong to the sixth series-connected set 1026 are electrically connected in series by the sixth intrastage wire 1065. The number of module batteries 1040 connected in series may increase or decrease.

The first to third series-connected sets 1021 to 1023 are electrically connected in series by the first interstage wire 1027. The fourth to sixth series-connected sets 1024 to 1026 are electrically connected in series by the second interstage wire 1028. The number of series-connected sets connected in series may increase or decrease.

(Arrangement of Module Batteries)

As illustrated in FIG. 1, the 40 module batteries 1040 are arranged in a rectangular parallelepiped grid. The 40 module batteries 1040 are arranged in four columns in the right-left direction DH1, two rows in the back-and-forth direction DH2, and five stages in the up-down direction DV. The right-left direction DH1 and the back-and-forth direction DH2 are horizontal, and the up-down direction DV is vertical. The right-left direction DH1, the back-and-forth direction DH2, and the up-down direction DV are perpendicular to one another. The arrangement of the 40 module batteries 1040 may form a grid of different shapes other than a rectangular parallelepiped. It is possible to increase or decrease all or some of the number of columns in the left-right direction DH1, the number of rows in the back-and-forth direction DH2, and the number of stages in the up-down direction DV.

The eight module batteries 1040 in the first stage from the bottom of the up-down direction DV belong to the first series-connected set 1021. The eight module batteries 1040 in the second stage from the bottom of the up-down direction DV belong to the second series-connected set 1022. The four module batteries 1040 in the third stage from the bottom of the up-down direction DV and in the first row from the front of the back-and-forth direction DH2 belong to the third series-connected set 1023. The four module batteries 1040 in the third stage from the bottom of the up-down direction DV and in the second row from the front of the back-and-forth direction DH2 belong to the fourth series-connected set 1024. The eight module batteries 1040 in the fourth stage from the bottom of the up-down direction DV belong to the fifth series-connected set 1025. The eight module batteries 1040 in the fifth stage from the bottom of the up-down direction DV belong to the sixth series-connected set 1026.

The first to third series-connected sets 1021 to 1023 are arranged in the up-down direction DV. The fourth to sixth series-connected sets 1024 to 1026 are arranged in the up-down direction DV.

(Arrangement of Intrastage Wires)

As illustrated in FIG. 1, each of the first to sixth intrastage wires 1060 to 1065 extends in the horizontal direction and connects the module batteries 1040 arranged in the horizontal direction. The first to sixth intrastage wires 1060 to 1065 are thus disposed away from the space between a vacuum insulation container 1120 and an atmospheric insulation lid 1121, which will be described later. Accordingly, the first to sixth intrastage wires 1060 to 1065 are hard to be affected by the combustion of the module batteries 1040.

(Storage in Housing)

As illustrated in FIG. 1, the housing 1020 has a housing space 1080 therein. The first to sixth series-connected sets 1021 to 1026, the first interstage wire 1027, and the second interstage wire 1028 are housed in the housing space 1080.

(Operation of Power Storage Apparatus)

In the case of charging the power storage apparatus 1000, electric power is supplied from the outside of the power storage apparatus 1000 to the module batteries 1040 via the first to sixth intrastage wires 1060 to 1065, the first interstage wire 1027, and the sixth intrastage wire 1065 so that the module batteries 1040 are charged. In the case of discharging the power storage apparatus 1000, electric power is discharged from the module batteries 1040 and supplied from the module batteries 1040 to the outside of the power storage apparatus 1000 via the first to sixth intrastage wires 1060 to 1065, the first interstage wire 1027, and the second interstage wire 1028.

(Example of Use of Power Storage Apparatus)

A schematic diagram of FIG. 2 illustrates an example of use of the power storage apparatus.

As illustrated in FIG. 2, the power storage apparatus 1000 is connected to an electric power system 9000 and used for various applications such as preventing power failures or controlling the supply and demand of electric power.

(Overview of Module Battery)

Figure 3:
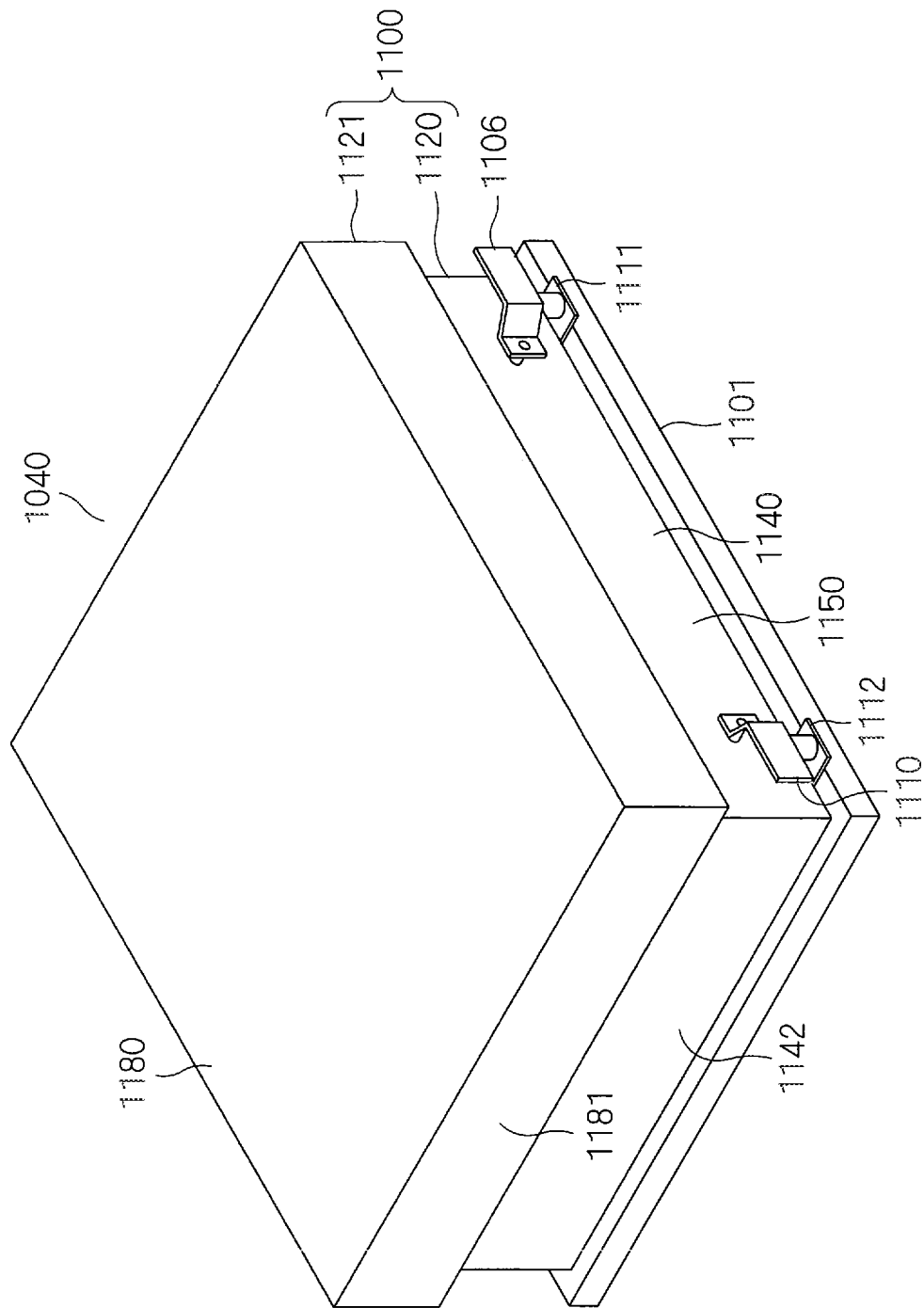
FIG. 3 is a perspective view of a module battery.
Figure 4:
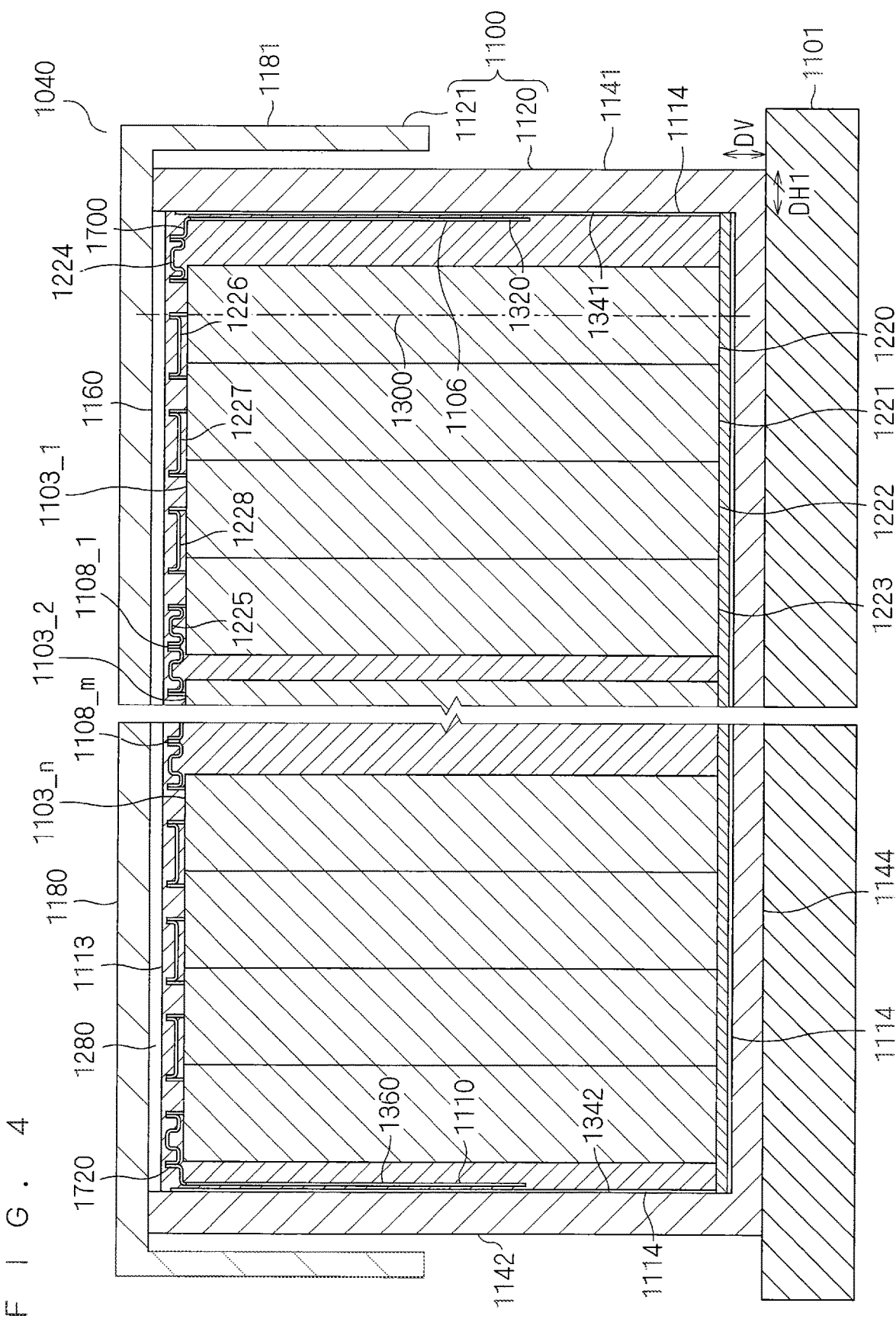
FIG. 4 is a vertical cross-sectional view of the module battery.
Figure 5:
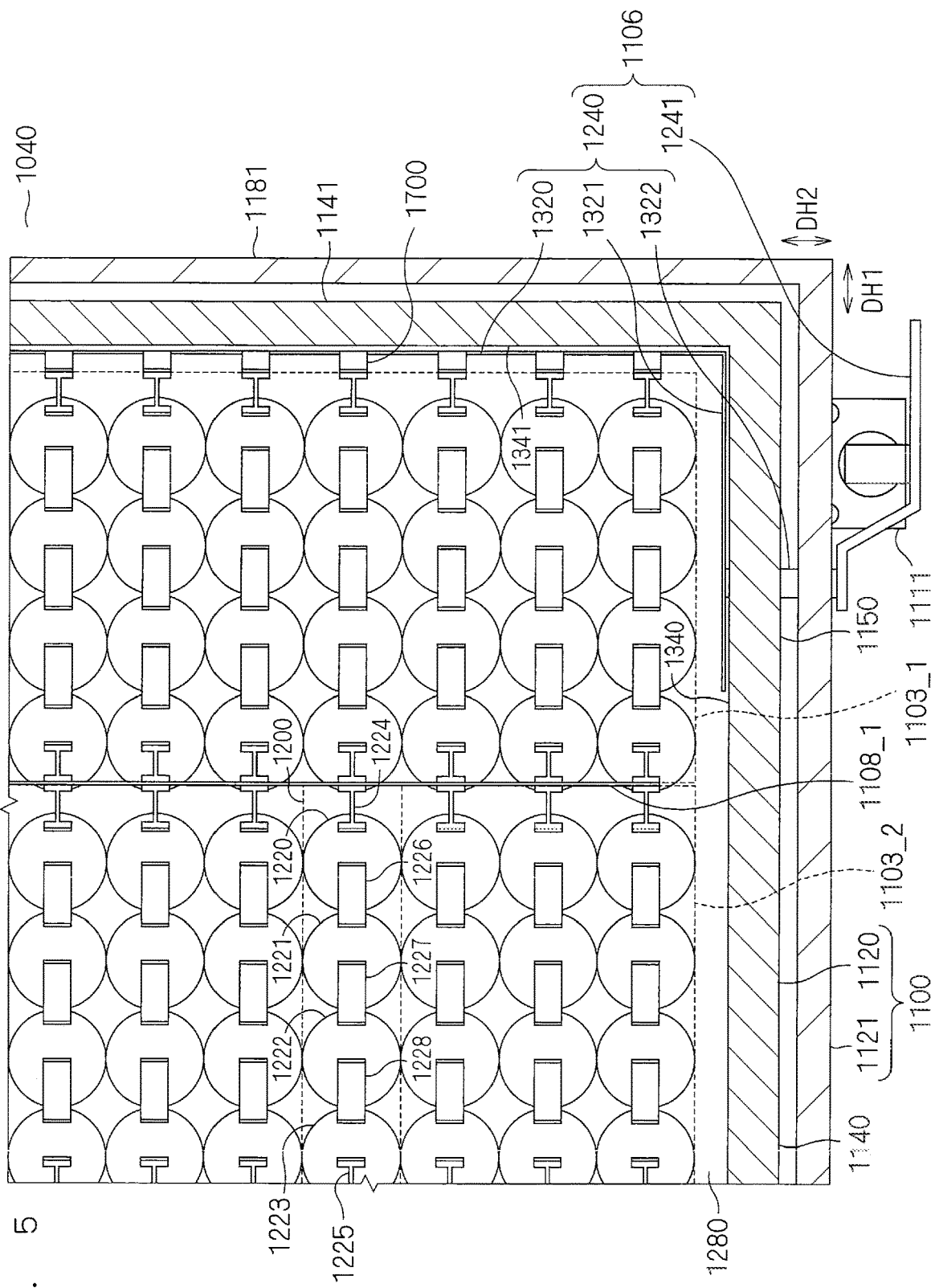
FIG. 5 is a horizontal cross-sectional view of the module battery.
Figure 6:
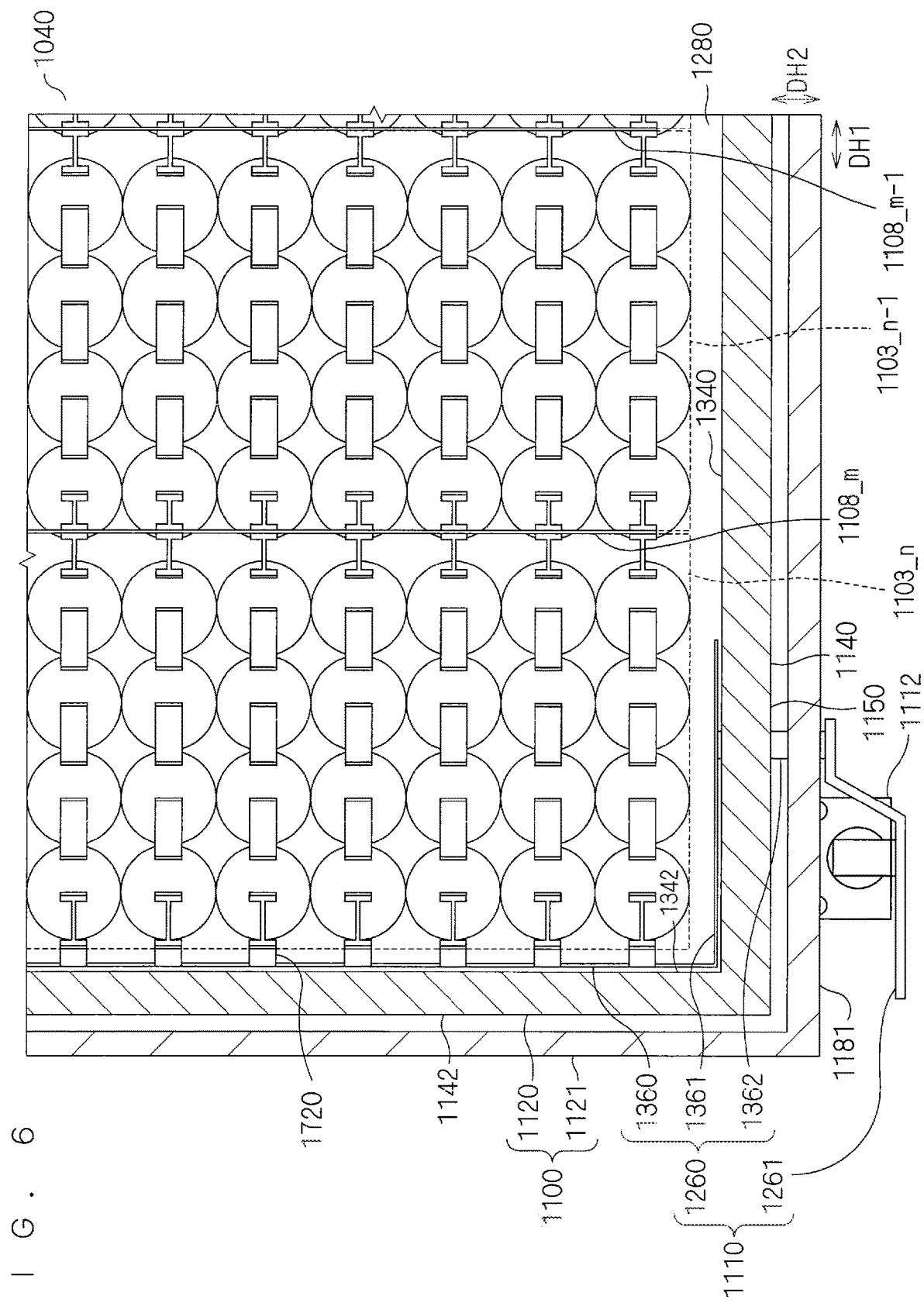
FIG. 6 is another horizontal cross-sectional view of the module battery.
Figure 7:
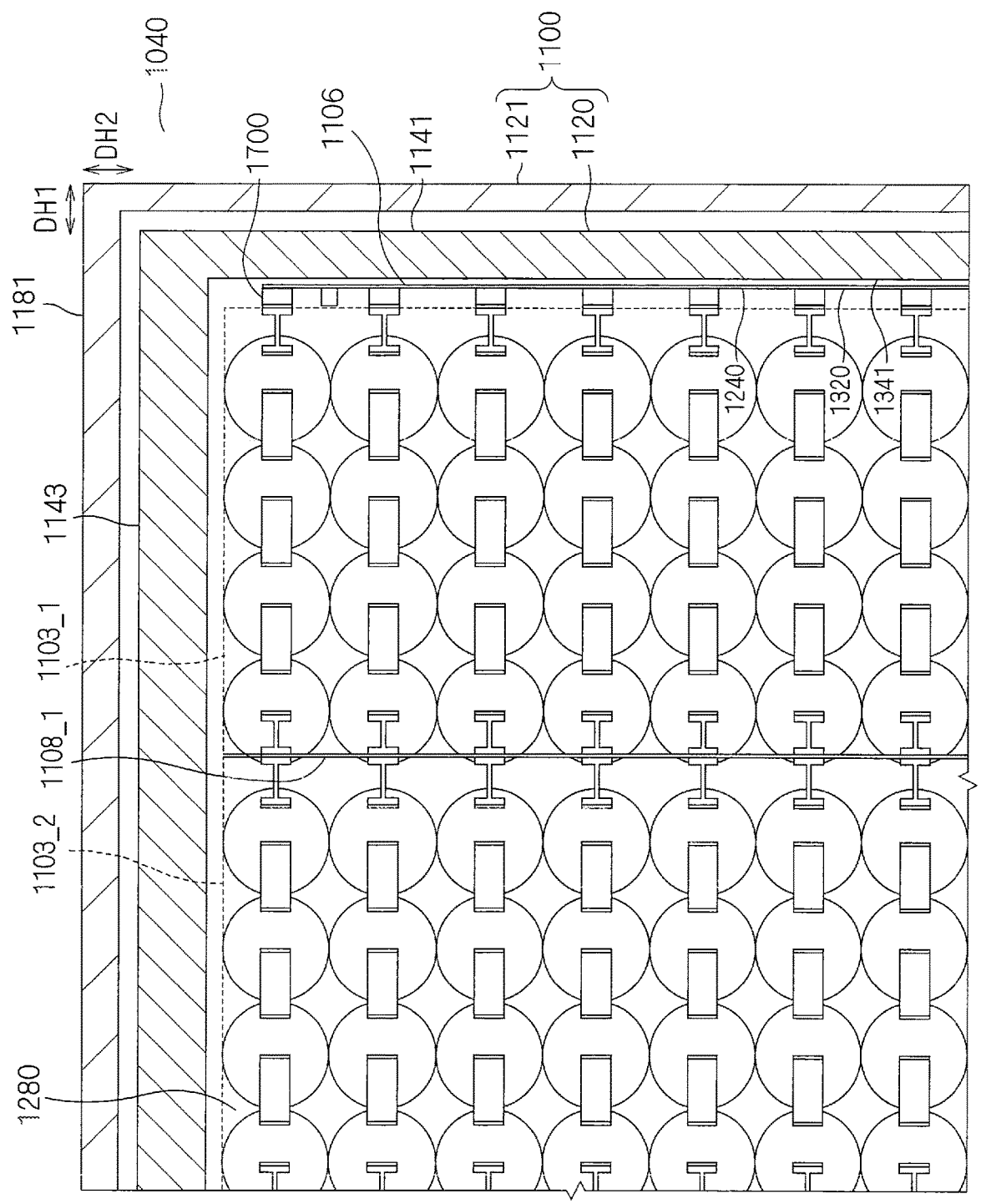
FIG. 7 is another horizontal cross-sectional view of the module battery.
Figure 8:
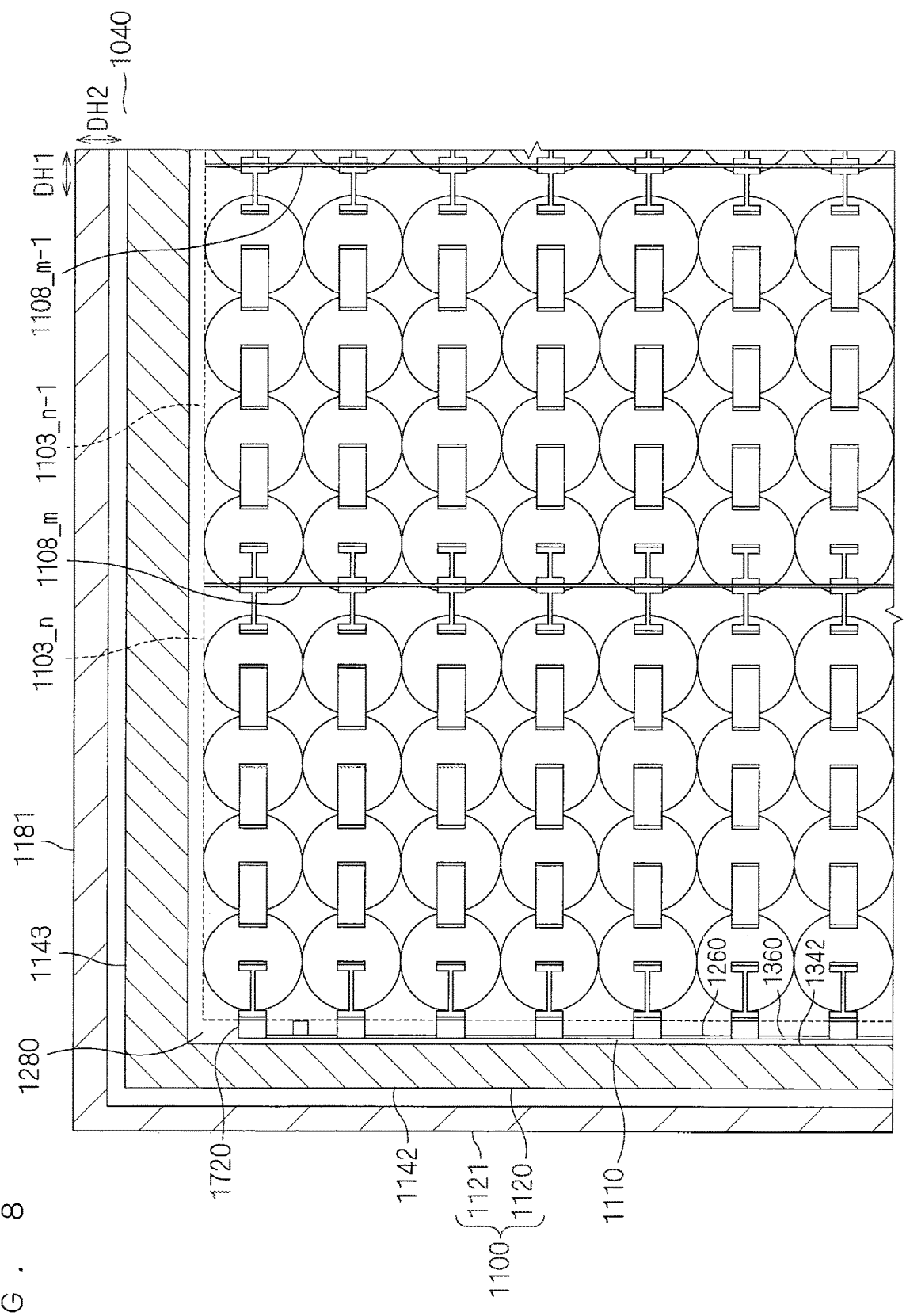
FIG. 8 is another horizontal cross-sectional view of the module battery.

A schematic diagram of FIG. 3 is a perspective view of a module battery. A schematic diagram of FIG. 4 is a vertical cross-sectional view of the module battery. Schematic diagrams of FIGS. 5 to 8 are horizontal cross-sectional views of the module battery. FIGS. 5 to 8 illustrate the module battery excluding sand and a heater, which will be described later. FIGS. 5 to 8 respectively illustrate the right front side, left front side, right back side, and left back side of the module battery.

As illustrated in FIGS. 3 to 8, each of the 40 module batteries 1040 includes a case 1100, a base 1101, n string groups 1103_1, 1103_2, . . . , and 1103_n, a positive electrode 1106, m parallel buses 1108_1, 1108_2, . . . , and 1108_m, a negative electrode 1110, a positive electrode supporter 1111, a negative electrode supporter 1112, sand 1113, and a heater 1114. The positive electrode 1106 is one main pole, and the negative electrode 1110 is the other main pole.

The number n of string groups included in each of the module batteries 1040 is two or more. Alternatively, the number n of string groups included in each of the module batteries 1040 may be one. The number m of parallel buses included in each of the module batteries 1040 increases or decreases depending on the number n of string groups included in each of the module batteries 1040.

(Case)

As illustrated in FIGS. 3 to 8, the case 1100 consists of the vacuum insulation container 1120 and the atmospheric insulation lid 1121. The vacuum insulation container 1120 has a shape of about a rectangular parallelepiped. The insulation efficiency of the case 1100 varies depending on the specifications of the module battery 1040. The vacuum insulation container 1120 thus may be replaced by another insulation container other than the vacuum insulation container, or may be replaced by a container that is not an insulation container. The atmospheric insulation lid 1121 may also be replaced by another insulation lid other than the atmospheric insulation lid, or may be replaced by a lid that is not an insulation lid. The case 1100 may have a different shape.

The vacuum insulation container 1120 has a first side wall 1140, a second side wall 1141, a third side wall 1142, a fourth side wall 1143, a bottom wall 1144, and an opening 1160. The atmospheric insulation lid 1121 includes a ceiling wall 1180 and a flange 1181.

The atmospheric insulation lid 1121 closes the opening 1160. The case 1100 is placed on the base 1101.

(Connections of Cells)

As illustrated in FIGS. 3 to 8, each of the n string groups 1103_1, 1103_2, . . . , and 1103_n includes p strings 1200. The number p of strings 1200 included in each of the n string groups 1103_1, 1103_2, . . . , and 1103_n is two or more.

Each of the n×p strings 1200 includes a first cell 1220, a second cell 1221, a third cell 1222, a fourth cell 1223, a first fuse 1224, a second fuse 1225, a first cell connector 1226, a second cell connector 1227, and a third cell connector 1228. The number of cells included in each of the n×p strings 1200 may increase or decrease. In general, each of the n×p strings 1200 includes two or more cells.

The number of cells included in the module battery 1040 may increase or decrease. More generally, the module battery 1040 includes two or more cells. The manner in which two or more cells are connected varies depending on the specifications of the module battery 1040.

(Main Pole)

As illustrated in FIGS. 3 to 8, the positive electrode 1106 includes a positive bus 1240 and a positive bus bar 1241. The negative electrode 1110 includes a negative bus 1260 and a negative bus bar 1261.

(Storage in Case)

As illustrated in FIGS. 3 to 8, the case 1100 has an accommodation space 1280 therein. The n string groups 1103_1, 1103_2, . . . , and 1103_n, the m parallel buses 1108_1, 1108_2, . . . , and 1108_m, the sand 1113, and the heater 1114 are housed in the accommodation space 1280. The base 1101, the positive electrode supporter 1111, the negative electrode supporter 1112, the positive bus bar 1241, and the negative bus bar 1261 are disposed outside the case 1100. The positive bus 1240 and the negative bus 1260 extend across the accommodation space 1280 and outside of the case 1100.

(Charging/Discharging of Module Battery)

In the case of charging or discharging the module battery 1040, the first to fourth cells 1220 to 1223 are charged or discharged via the positive electrode 1106 and the negative electrode 1110.

The first to fourth cells 1220 to 1223 are sodium-sulfur batteries. In the case of charging or discharging the module battery 1040, the temperature in the accommodation space 1280 is adjusted by the heater 1114 to a temperature at which the sodium-sulfur batteries operate. For example, the temperature in the accommodation space 1280 is adjusted to about 300° C. The sodium-sulfur batteries may be replaced by other types of secondary batteries.

(Arrangement of Side Walls and Opening)

As illustrated in FIG. 1, outer surfaces 1150 of the first side walls 1140 of the 20 module batteries 1040 in the first row from the front of the back-and-forth direction DH2 face forward in the back-and-forth direction DH2. Outer surfaces 1150 of the first side walls 1140 of the 20 module batteries 1040 in the second row from the front of the back-and-forth direction DH2 face backward in the back-and-forth direction DH2. The opening 1160 faces upward in the up-down direction DV as illustrated in FIG. 4.

(Arrangement of Cells, Strings, and String Groups)

As illustrated in FIGS. 4 to 7, the n string groups 1103_1, 1103_2, . . . , and 1103_n are arranged linearly in the right-left direction DH1 (width direction of the module battery 1040). The arrangement of the n string groups 1103_1, 1103_2, . . . , and 1103_n may be reversed from side to side. Such a linear arrangement of the n string groups 1103_1, 1103_2, . . . , and 1103_n that involves no turns produces less short circuits between one and other string groups than a non-linear arrangement that involves turns, thus improving the safety of the power storage apparatus 1000.

In each of the n string groups 1103_1, 1103_2, . . . , and 1103_n, the p strings 1200 are arranged in the back-and-forth direction DH2 (depth direction of the module battery 1040).

In each of the strings 1200, the first to fourth cells 1220 to 1223 are arranged in the right-left direction DH1.

The first to fourth cells 1220 to 1223 are each a cylindrical cell that has a cylindrical axis 1300 and is in a vertically upright position. The cylindrical axis 1300 extends in the up-down direction DV.

(Structure and Placement of Positive Bus)

Figure 9:
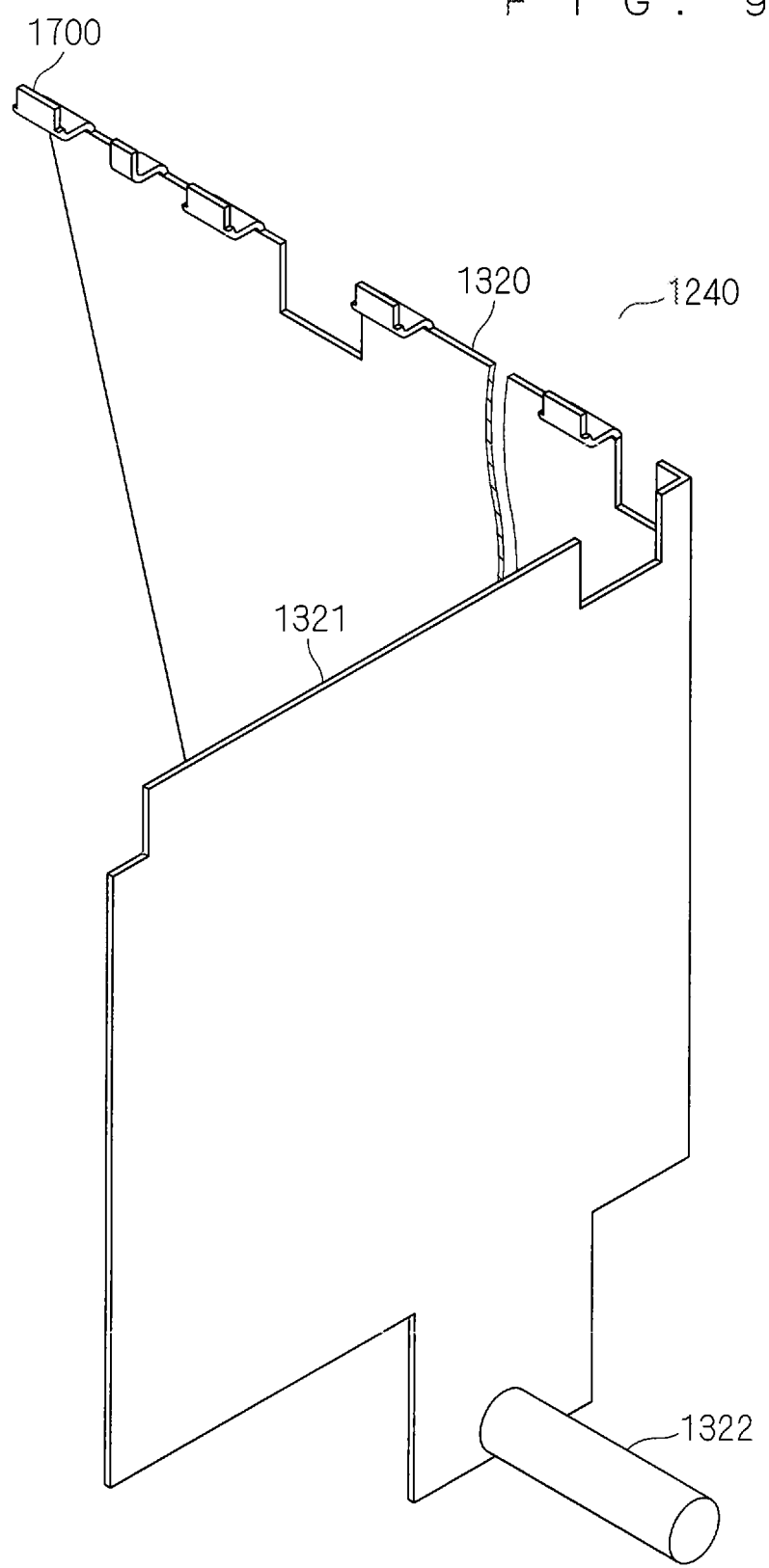
FIG. 9 is a perspective view of a positive bus.

A schematic diagram of FIG. 9 is a perspective view of the positive bus.

As illustrated in FIGS. 4, 5, 7, and 9, the positive bus 1240 includes a positive electrode current collecting plate 1320, a positive electrode extension plate 1321, and a positive pole 1322.

The positive electrode current collecting plate 1320 and the positive electrode extension plate 1321 are housed in the accommodation space 1280. The positive pole 1322 penetrates through the first side wall 1140.

The positive electrode current collecting plate 1320 and the positive electrode extension plate 1321 are continuous. The positive electrode current collecting plate 1320 and the positive electrode extension plate 1321 constitute a single part that is bent at the right angle, and are electrically connected to each other. Alternatively, the positive electrode current collecting plate 1320 and the positive electrode extension plate 1321 may be a joint assembly of two or more parts.

The plate-like shapes of the positive electrode current collecting plate 1320 and the positive electrode extension plate 1321 contribute to reducing the electrical resistance of the positive bus 1240. Alternatively, the positive electrode current collecting plate 1320 and the positive electrode extension plate 1321 may be replaced by components of different shapes other than plate-like shapes. For example, the positive electrode current collecting plate 1320 and the positive electrode extension plate 1321 may be replaced by rod-like or tube-like components.

The positive pole 1322 is coupled to the positive electrode extension plate 1321 in the accommodation space 1280 and is coupled to the positive bus bar 1241 outside the case 1100. The positive electrode current collecting plate 1320, the positive electrode extension plate 1321, the positive pole 1322, and the positive bus bar 1241 are electrically connected to one another.

The pole-like shape of the positive pole 1322 contributes to inhibiting absorption and emission of heat via the positive pole 1322. Alternatively, the positive pole 1322 may be replaced by a component of different shape other than the pole-like shape. For example, the positive pole 1322 may be replaced by a plate-like component.

The positive electrode current collecting plate 1320 is along an inner surface 1341 of the second side wall 1141. The positive electrode extension plate 1321 is along an inner surface 1340 of the first side wall 1140.

(Positive Bus Bar)

As illustrated in FIG. 1, the positive bus bar 1241 forms a positive terminal. The positive bus bar 1241 is coupled to one of the first to sixth intrastage wires 1060 to 1065, the first interstage wire 1027, and the second interstage wire 1028. Alternatively, a configuration is also possible in which the positive bus bar 1241 is omitted, and a portion of the positive pole 1322 that is exposed outside the case 1100 forms a positive terminal. As another alternative, the positive bus bar 1241 may be replaced by a terminal having a shape that is hard to be called a "bus bar."

(Structure and Placement of Negative Bus)

Figure 10:
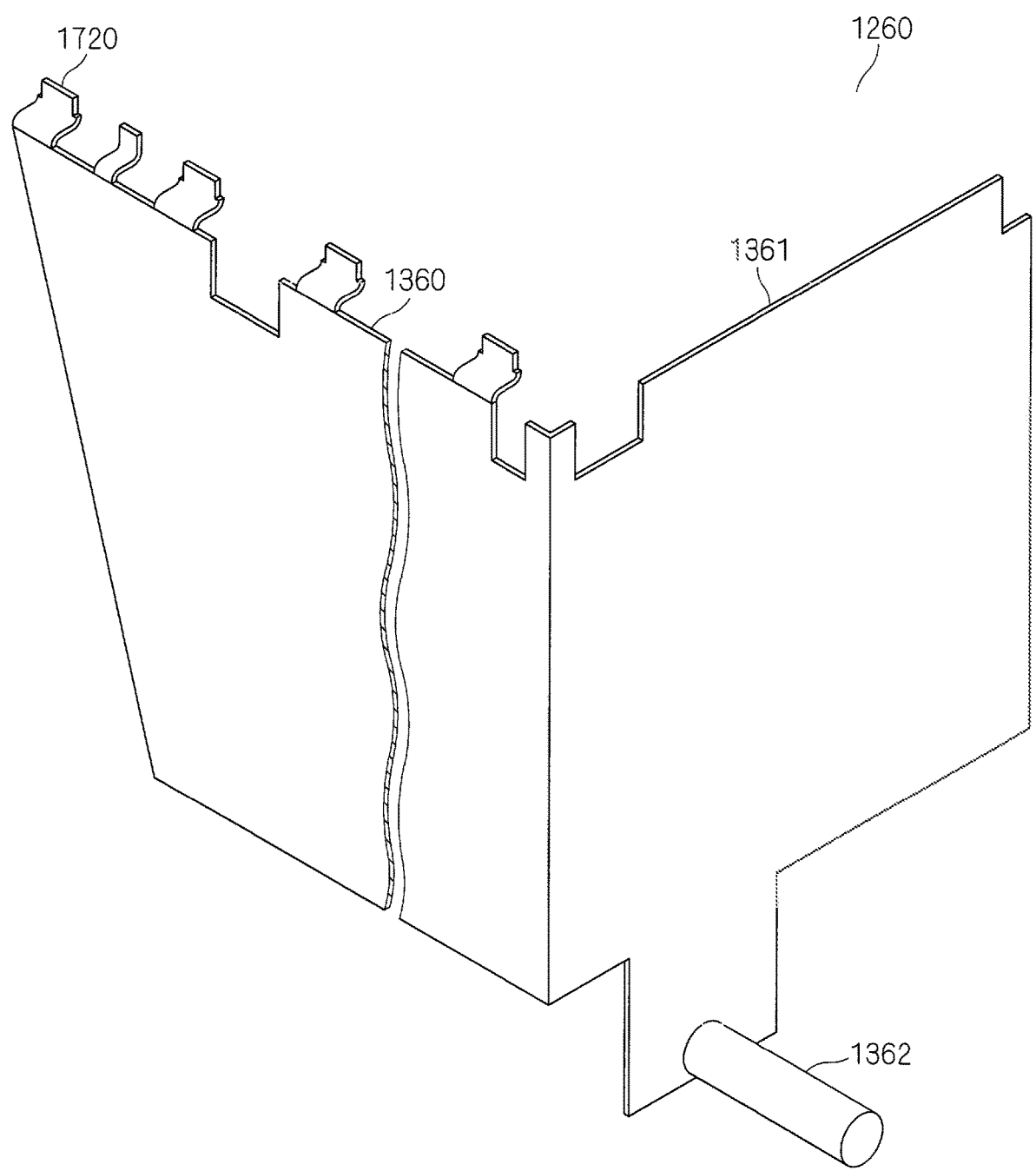
FIG. 10 is a perspective view of a negative bus.

A schematic diagram of FIG. 10 is a perspective view of the negative bus.

As illustrated in FIGS. 4, 6, 8, and 10, the negative bus 1260 includes a negative electrode current collecting plate 1360, a negative electrode extension plate 1361, and a negative pole 1362.

The negative electrode current collecting plate 1360 and the negative electrode extension plate 1361 are housed in the accommodation space 1280. The negative pole 1362 penetrates through the first side wall 1140.

The negative electrode current collecting plate 1360 and the negative electrode extension plate 1361 are continuous. The negative electrode current collecting plate 1360 and the negative electrode extension plate 1361 constitute a single part that is bent at the right angle, and are electrically connected to each other. Alternatively, the negative electrode current collecting plate 1360 and the negative electrode extension plate 1361 may be a joint assembly of two or more parts.

The plate-like shapes of the negative electrode current collecting plate 1360 and the negative electrode extension plate 1361 contribute to reducing the electrical resistance of the negative bus 1260. Alternatively, the negative electrode current collecting plate 1360 and the negative electrode extension plate 1361 may be replaced by components of different shapes other than the plate-like shapes. For example, the negative electrode current collecting plate 1360 and the negative electrode extension plate 1361 may be replaced by rod-like or tube-like components.

The negative pole 1362 is coupled to the negative electrode extension plate 1361 in the accommodation space 1280 and is coupled to the negative bus bar 1261 outside the case 1100. The negative electrode current collecting plate 1360, the negative electrode extension plate 1361, the negative pole 1362, and the negative bus bar 1261 are electricity connected to one another.

The pole-like-shape of the negative pole 1362 contributes to inhibiting absorption and emission of heat via the negative pole 1362. Alternatively, the negative pole 1362 may be replaced by a component of different shape other than the pole-like shape. For example, the negative pole 1362 may be replaced by a plate-like component.

The negative electrode current collecting plate 1360 is along an inner surface 1342 of the third side wall 1142. The negative electrode extension plate 1361 is along the inner surface 1340 of the first side wall 1140.

(Negative Bus Bar)

As illustrated in FIG. 1, the negative bus bar 1261 forms a negative terminal. The negative bus bar 1261 is coupled to one of the first to sixth intrastage wires 1060 to 1065, the first interstage wire 1027, and the second interstage wire 1028. Alternatively, a configuration is also possible in which the negative bus bar 1261 is omitted, and a portion of the negative pole 1362 that is exposed outside the case 1100 forms a negative terminal. As another alternative, the negative bus bar 1261 may be replaced by a terminal having a shape that is hard to be called a "bus bar."

(Connection Structure)

Figure 11:
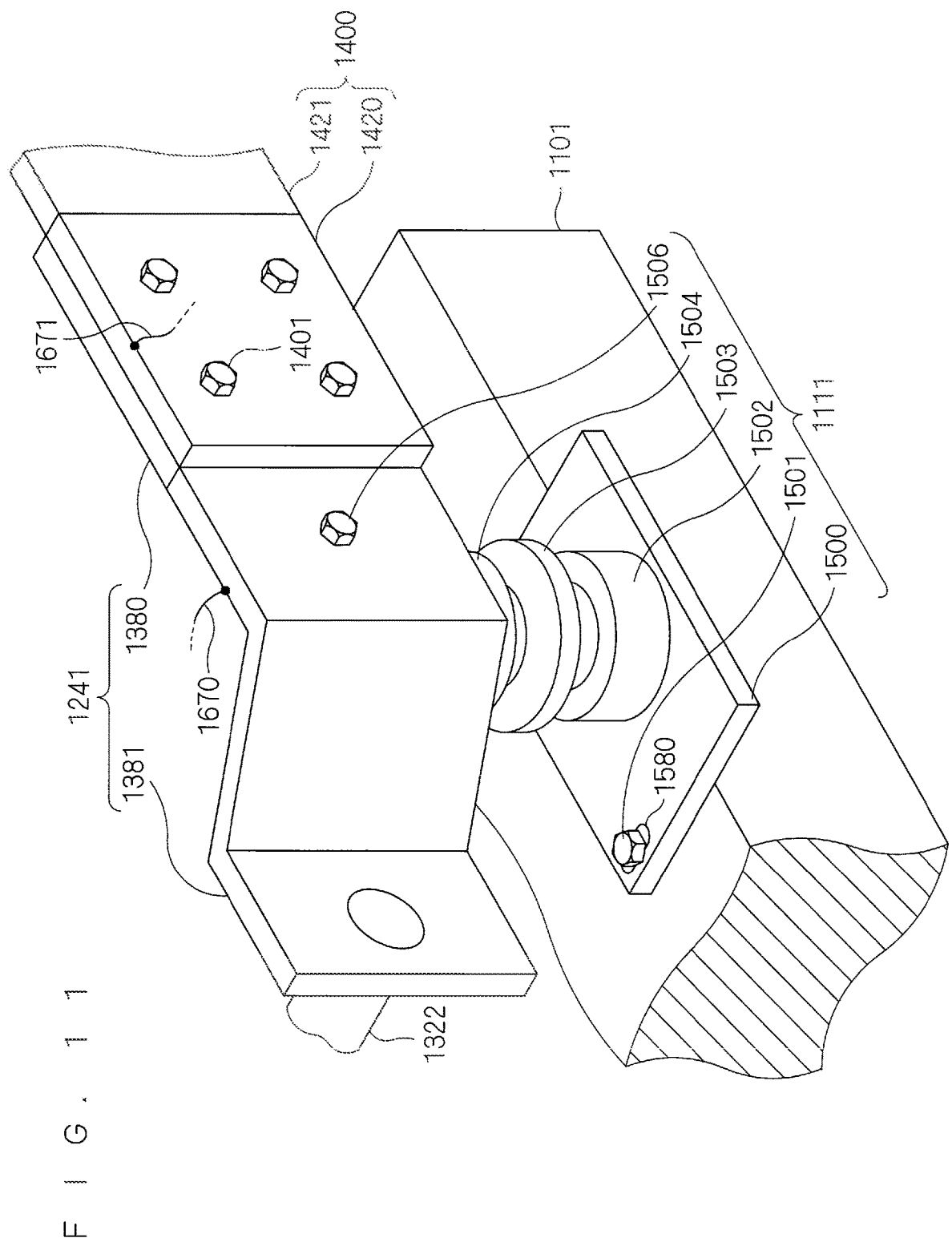
FIG. 11 is a perspective view of a positive bus bar and the vicinity thereof.
Figure 12:
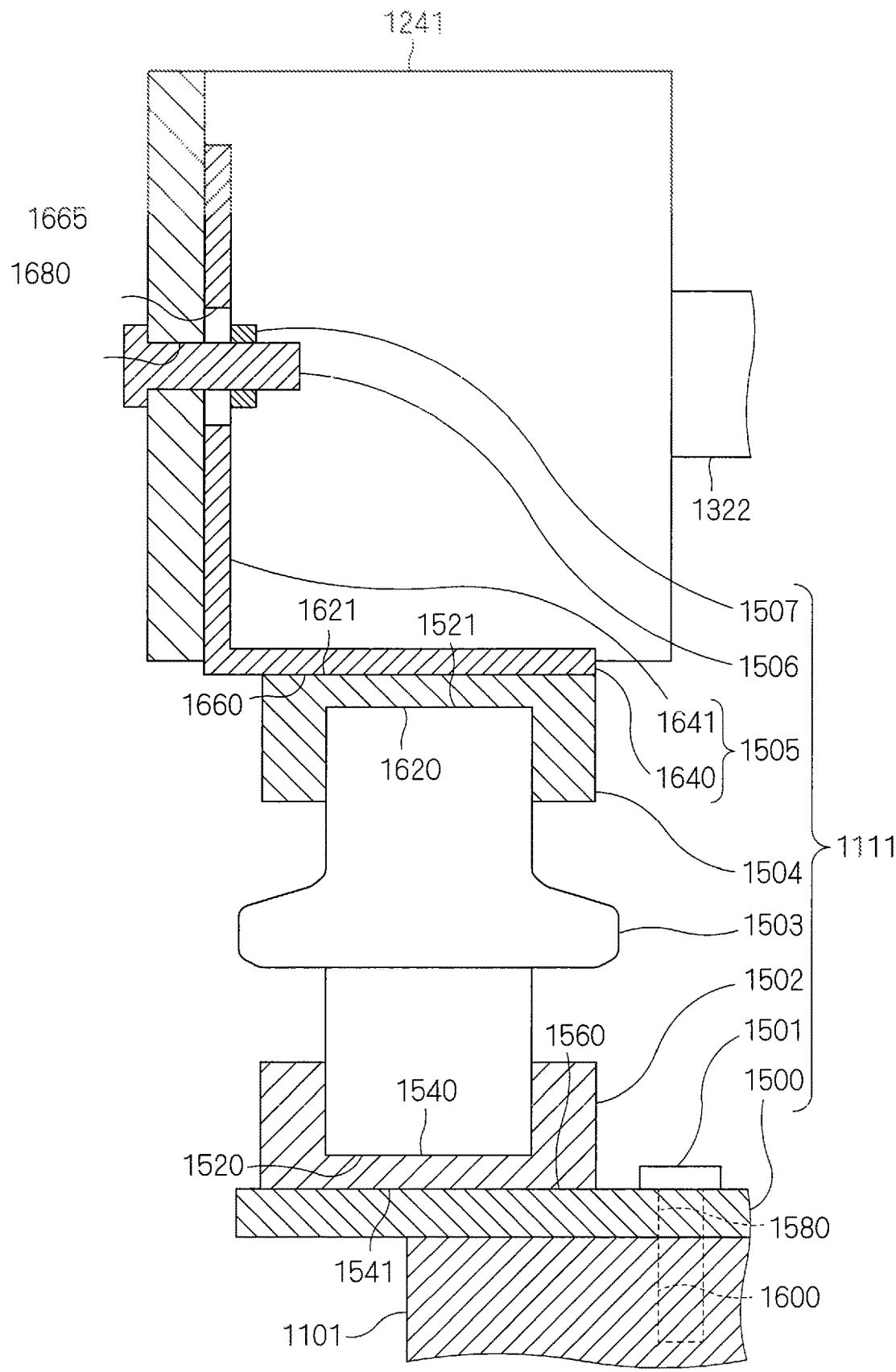
FIG. 12 is a vertical cross-sectional view of the positive bus bar and the vicinity thereof.
Figure 13:
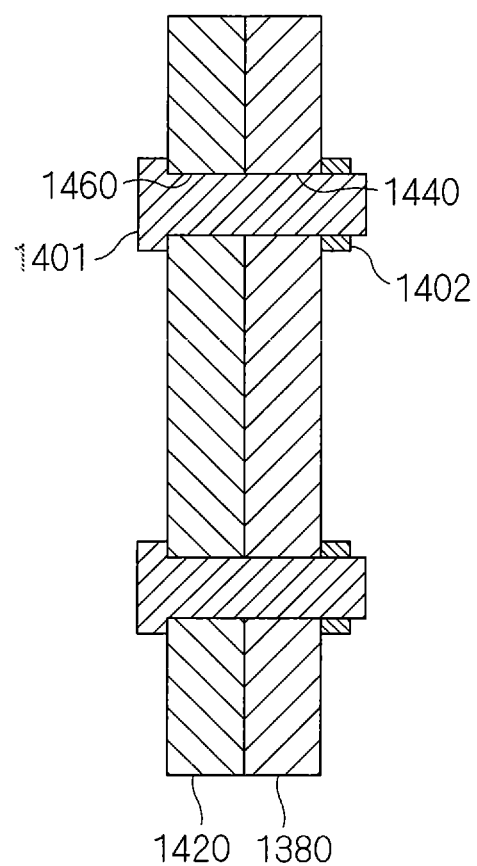
FIG. 13 is a cross-sectional view of a structure of connection between the positive bus bar and a flexible conductor.

A schematic diagram of FIG. 11 is a perspective view of the positive bus bar and the vicinity thereof. A schematic diagram of FIG. 12 is a vertical cross-sectional view of the positive bus bar and the vicinity thereof. FIG. 13 is a cross-sectional view illustrating a structure of connection between the positive bus bar and a flexible conductor.

As illustrated in FIGS. 11 to 13, the positive bus bar 1241 includes a connecting part 1380 and a proximity part 1381. Each of the first to sixth intrastage wires 1060 to 1065 includes a flexible conductor 1400. The flexible conductor 1400 connects the positive bus bar 1241 of one module battery 1040 and the negative bus bar 1261 of another module battery 1040. The one and other module batteries 1040 are adjacent to each other in the right-left direction DH1. The flexible conductor 1400 includes a connecting part 1420 and a mesh wire 1421.

The proximity part 1381 of the positive bus bar 1241 is coupled to the positive pole 1322.

The connecting part 1380 of the positive bus bar 1241 has bolt holes 1440. The connecting part 1420 of the flexible conductor 1400 also has bolt holes 1460. The connecting part 1380 of the positive bus bar 1241 and the connecting part 1420 of the flexible conductor 1400 are superimposed one above the other, and bolts 1401 are inserted into the bolt holes 1440 of the connecting part 1380 of the positive bus bar 1241 and the bolt holes 1460 of the connecting part 1420 of the flexible conductor 1400. Nuts 1402 are screwed on the bolts 1401. The connecting part 1380 of the positive bus bar 1241 and the connecting part 1420 of the flexible conductor 1400 are tightened with the bolts 1401 and the nuts 1402.

The bolts 1401 and the nuts 1402 constitute a tightening mechanism for tightening the connecting part 1380 of the positive bus bar 1241 and the connecting part 1420 of the flexible conductor 1400. Alternatively, the bolts 1401 and the nuts 1402 may be replaced by other types of tightening mechanisms. For example, the bolts 1401 and the nuts 1402 may be replaced by rivets.

The surface of the connecting part 1380 of the positive bus bar 1241 and the surface of the connecting part 1420 of the flexible conductor 1400 are nickel plated.

The nickel-plated surfaces of the connecting part 1380 of the positive bus bar 1241 and the connecting part 1420 of the flexible conductor 1400 provide higher durability and heat resistance of the positive bus bar 1241 and the flexible conductor 1400 than silver-plated surfaces, but they increase connection resistance. The problem of increasing connection resistance can be resolved by increasing the contact surface of the connecting part 1380 of the positive bus bar 1241 and the connecting part 1420 of the flexible conductor 1400 and bringing the connecting part 1380 of the positive bus bar 1241 and the connecting part 1420 of the flexible conductor 1400 into strong contact with each other.

The positive bus bar 1241 has a plate-like shape. The connecting part 1380 of the positive bus bar 1241 occupies one end of the positive bus bar 1241, whereas the proximity part 1381 of the positive bus bar 1241 occupies the other end of the positive bus bar 1241. The connecting part 1380 and the proximity part 1381 of the positive bus bar 1241 are arranged in parallel with an outer surface 1150 of the first side wall 1140. The distance from the first side wall 1140 to the connecting part 1380 of the positive bus bar 1241 is longer than the bolt length of the bolts 1401 and is also longer than the distance from the first side wall 1140 to the proximity part 1381. Preferably, the distance from the first side wall 1140 to the connecting part 1380 of the positive bus bar 1241 is two times or more of the bolt length.

If the distance from the first side wall 1140 to the connecting part 1380 of the positive bus bar 1241 is longer than the bolt length, the bolts 1401 are hard to come in contact with the first side wall 1140.

If the distance from the first side wall 1140 to the proximity part 1381 of the positive bus bar 1241 is short, the positive pole 1322 is shortened. This inhibits absorption and emission of heat via the positive pole 1322 and facilitates the adjustment of the temperature in the accommodation space 1280.

The negative bus bar 1261 and the flexible conductor 1400 are also connected in a similar manner, except that the positive bus bar 1241 and the negative bus bar 1261 have bilaterally symmetrical structures.

(Supporting Structure)

As illustrated in FIGS. 11 and 12, the positive electrode supporter 1111 includes a pedestal 1500, a bolt 1501 for securing the pedestal, a bottom cap 1502, an insulator 1503, a top cap 1504, an L-shaped metal fitting 1505, a bolt 1506 for securing the L-shaped metal fitting, and a nut 1507 for securing the L-shaped metal fitting.

A lower end 1520 of the insulator 1503 and an inner surface 1540 of the bottom cap 1502 are cemented to each other. Alternatively, the lower end 1520 of the insulator 1503 and the inner surface 1540 of the bottom cap 1502 may be joined to each other by different methods other than cementing.

An outer surface 1541 of the bottom cap 1502 and an upper surface 1560 of the pedestal 1500 are welded to each other. Alternatively, the outer surface 1541 of the bottom cap 1502 and the upper surface 1560 of the pedestal 1500 may be joined to each other by different methods other than welding.

The pedestal 1500 is secured to the base 1101 with the bolt 1501 for securing the pedestal. The pedestal 1500 has a bolt hole 1580. The base 1101 has a bolt hole 1600, and a thread groove is cut in the inner surface of the bolt hole 1600. The pedestal 1500 is placed on the base 1101. The bolt 1501 for securing the pedestal is inserted into the bolt hole 1580 of the pedestal 1500 and the bolt hole 1600 of the base 1101 and screwed into the thread groove of the bolt hole 1600 of the base 1101. The bolt hole 1580 of the pedestal 1500 is a slot extending in the back-and-forth direction DH2. This makes the position of the pedestal 1500 adjustable in the back-and-forth direction DH2.

An upper end 1521 of the insulator 1503 and an inner surface 1620 of the upper-end cap 1504 are cemented to each other. Alternatively, the upper end 1521 of the insulator 1503 and the inner surface 1620 of the upper-end cap 1504 may be joined to each other by different methods other than cementing.

An outer surface 1621 of the upper-end cap 1504 and an outer surface 1660 of a horizontal part 1640 of the L-shaped metal fitting 1505 are welded to each other. Alternatively, the outer surface 1621 of the upper-end cap 1504 and the outer surface 1660 of the horizontal part 1640 of the L-shaped metal fitting 1505 may be joined to each other by different methods other than welding.

A vertical part 1641 of the L-shaped metal fitting 1505 is secured to the positive bus bar 1241 with the bolt 1506 for securing the L-shaped metal fitting and the nut 1507. The vertical part 1641 of the L-shaped metal fitting 1505 has a bolt hole 1665. The positive bus bar 1241 has a bolt hole 1680. The vertical part 1641 of the L-shaped metal fitting 1505 and the positive bus bar 1241 are superimposed on each other. The bolt 1506 for securing the L-shaped metal fitting is inserted into the bolt hole 1665 of the L-shaped metal fitting 1505 and the bolt hole 1680 of the positive bus bar 1241. The nut 1507 for securing the L-shaped metal fitting is screwed onto the bolt 1506 for securing the L-shaped metal fitting. The bolt hole 1665 of the L-shaped metal fitting 1505 is a slot extending in the up-down direction DV. This makes the position of the L-shaped metal fitting 1505 adjustable in the up-down direction DV.

Variations in the dimensions of the insulator 1503 are accommodated by adjusting the positions of the pedestal 1500 and the L-shaped metal fitting 1505.

The positive bus bar 1241 is supported by the positive electrode supporter 1111. The pedestal 1500 coupled to the base 1101 and the L-shaped metal fitting 1505 coupled to the positive bus bar 1241 are insulated by the insulator 1503 from each other.

Alternatively, a coupling part to be coupled to the base 1101 may be other than the pedestal 1500, and a coupling part to be coupled to the positive bus bar 1241 may be other than the L-shaped metal fitting 1505.

Even if combustion of the module batteries 1040 affects the flexible conductor 1400, insulation can be maintained because the flexible conductor 1400 is hard to fall off when the positive bus bar 1241 is supported by the positive electrode supporter 1111. This improves the safety of the power storage apparatus 1000.

The negative electrode supporter 1112 supports the negative bus bar 1261 in a similar manner to the positive bus bar 1241 supporting the positive electrode supporter 1111.

(Voltage Measuring Wire)

As illustrated in FIG. 11, the positive bus bar 1241 is coupled to a first voltage measuring wire 1670, and the flexible conductor 1400 is coupled to a second voltage measuring wire 1671. The connection resistance between the positive bus bar 1241 and the flexible conductor 1400 can be measured from the current flowing through the module batteries 1040 and the voltage between the first voltage measuring wire 1670 and the second voltage measuring wire 1671. This enables easy detection of failures in contact between the positive bus bar 1241 and the flexible conductor 1400. Upon detection of a failure in contact, the charging or discharging of the module batteries 1040 is stopped.

(Connection between Strings)

Figure 14:
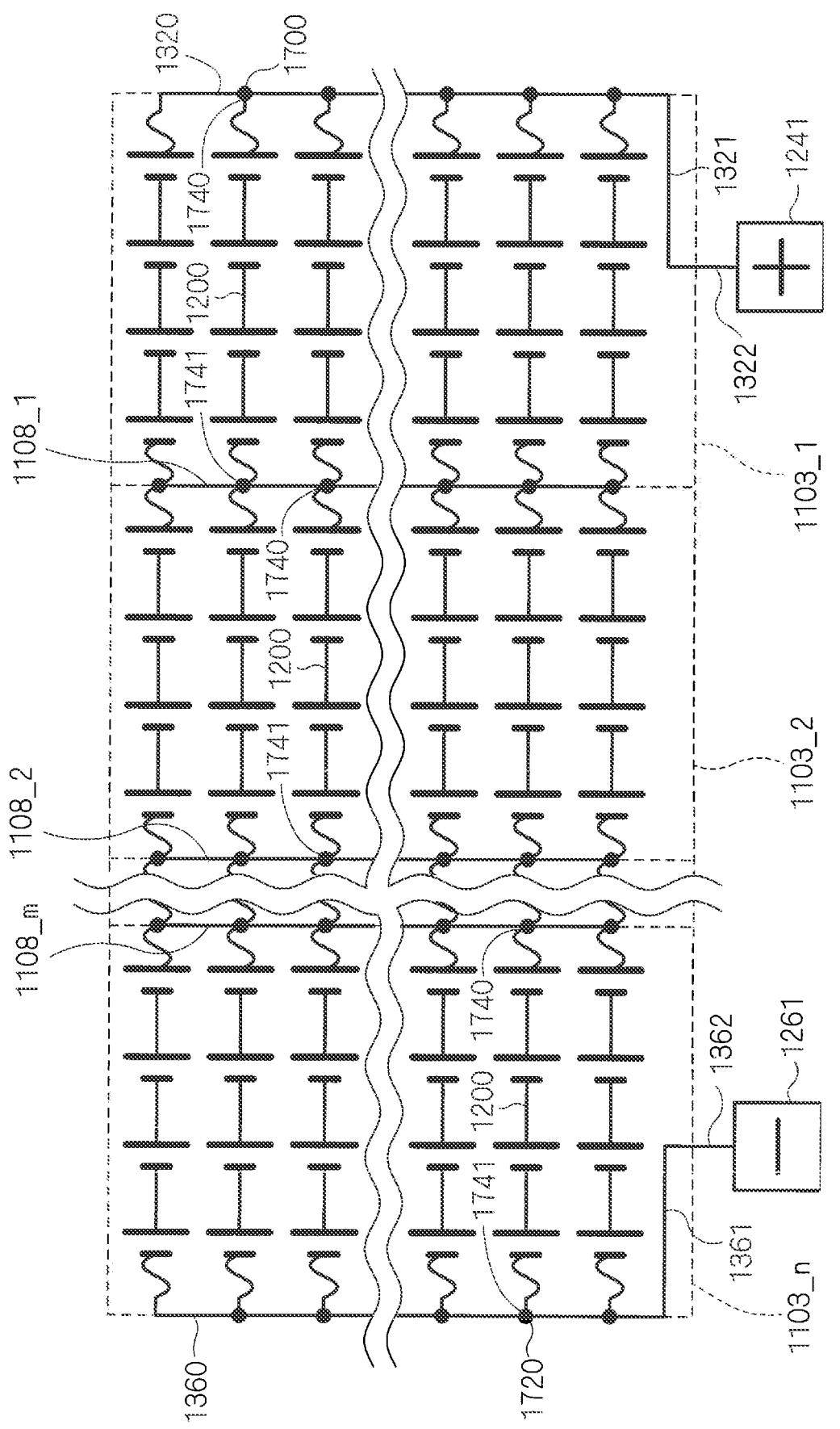
FIG. 14 is a circuit diagram of the module battery.

A circuit diagram of FIG. 14 illustrates a module battery.

As illustrated in FIGS. 4 to 10 and 14, the positive electrode current collecting plate 1320 includes p connection terminals 1700. The p connection terminals 1700 are at the upper end of the positive electrode current collecting plate 1320. The negative electrode current collecting plate 1360 includes p connection terminals 1720. The p connection terminals 1720 are at the upper end of the negative electrode current collecting plate 1360.

A positive terminal 1740 of each of the p strings 1200 that belong to the first string group 1103_1, which is disposed furthest to the positive electrode side, is coupled to one of the p connection terminals 1700. A negative terminal 1741 of each of the p strings 1200 of the first string group 1103_1 is coupled to the first parallel bus 1108_1. The p strings 1200 of the first string group 1103_1 are connected in parallel via the positive electrode current collecting plate 1320 and the first parallel bus 1108_1, forming a first block. The current flowing to the first block divides and flows through the p strings 1200 of the first string group 1103_1.

If an integer i is in the range of 2 to n−1, the positive terminal 1740 of each of the p strings 1200 that belong to the ith string group 1103_i is coupled to the (i−1)th parallel bus 1108_i−1. The negative terminal 1741 of each of the p strings 1200 of the ith string group 1103_i is coupled to the ith parallel bus 1108_i. The p strings 1200 of the ith string group 1103_i are connected in parallel via the (i−1)th parallel bus 1108_i−1 and the ith parallel bus 1108_i, forming the ith block. The current flowing to the ith block divides and flows through the p strings 1200 of the ith string group 1103_i.

The positive terminal 1740 of each of the p strings 1200 that belong to the nth string group 1103_n, which is disposed furthest to the negative electrode side, is coupled to the mth parallel bus 1108_m. The negative terminal 1741 of each of the p strings 1200 of the nth string group 1103_n is electrically coupled to one of the p connection terminals 1720. The p strings 1200 of the nth string group 1103_n are connected in parallel via the mth parallel bus 1108_m and the negative electrode current collecting plate 1360, forming the nth block. The current flowing to the nth block divides and flows through the p strings 1200 of the nth string group 1103_n.

(Connection in String)

As illustrated in FIGS. 4 to 8 and 14, the first to fourth cells 1220 to 1223, the first fuse 1224, and the second fuse 1225 in each of the strings 1200 are connected in series. The first to fourth cells 1220 to 1223 are connected in series by the first to third cell connectors 1226 to 1228. Alternatively, a configuration is also possible in which all or some of the first to third cell connectors 1226 to 1228 are omitted, and the negative terminal of each cell and the positive terminal of another cell is directly connected to each other. The number of cells connected in series may increase or decrease. Also, both or either of the first fuse 1224 and the second fuse 1225 may be omitted.

The current flowing to the string 1200 flows through the first to fourth cells 1220 to 1223, the first fuse 1224, and the second fuse 1225.

(Properties of Buses)

The buses including the positive bus 1240, the m parallel buses 1108_1, 1108_2, . . . , and 1108_m, the negative bus 1260, the positive bus bar 1241, and the negative bus bar 1261 are wiring structures that have low electrical resistance, high mechanical strength, and high heat resistance. They are typically plate-like or rod-like. Alternatively, all or some of the buses may be replaced by other types of wiring structures. For example, all or some of the buses may be replaced by cables.

The buses are preferably made of metals or alloys, more preferably, aluminum alloys.

The connection between the strings 1200 and the buses and the coupling of the buses are established by methods such as welding, swaging, or screwing that can resist high temperatures at which the sodium-sulfur batteries operate. This establishes electrical conduction between the strings 1200 and the buses, and electrical connection of the buses.

While the invention has been shown and described in detail, the foregoing description is in all aspects illustrative and not restrictive. It is therefore to be understood that numerous modifications and variations can be devised without departing from the scope of the invention.

DESCRIPTION OF REFERENCE SIGNS

1000 Power storage apparatus
1021 First series-connected set
1072 Second series-connected set
1023 Third series-connected set
1024 Fourth series-connected set
1025 Fifth series-connected set
1026 Sixth series-connected set
1027 First interstage wire
1028 Second interstage wire
1040 Module battery
1060 First intrastage wire
1061 Second intrastage wire
1062 Third intrastage wire
1063 Fourth intrastage wire
1064 Fifth intrastage wire
1100 Case
1101 Base
1106 Positive electrode
1110 Negative electrode
1111 Positive electrode supporter
1112 Negative electrode supporter
1120 Vacuum insulation container
1121 Atmospheric insulation lid
1241 Positive bus bar
1261 Negative bus bar
1322 Positive pole
1362 Negative pole
1400 Flexible conductor
1503 Insulator

The invention claimed is:

1. A power storage apparatus comprising:
two or more series-connected sets that are arranged in a vertical direction; and
an intrastage wire that connects said two or more series-connected sets in series,
each of said two or more series-connected sets including:
two or more module batteries that are arranged in a horizontal direction; and
an intrastage wire that connects said two or more module batteries in series and extends in the horizontal direction, and
each of said two or more module batteries including:
a case that has an accommodation space therein and includes a container and a lid, said container having a side wall and an opening, said opening facing upward in the vertical direction, and said lid closing said opening;
a base on which said case is placed;
a main pole that includes a main pole feedthrough part and a main pole terminal, said main pole feedthrough part penetrating through said side wall, and said main pole terminal being disposed outside said case;
a main pole supporter that includes an insulator, a first coupling part, and a second coupling part, said insulator insulating said first coupling part and said second coupling part from each other, said main pole supporter, which supports said main pole terminal disposed outside said case, is connected to said base, with said main pole supporter including said first coupling part, said insulator and said second coupling part, respectively stacked in that order in a vertically extending direction, and said first coupling part is coupled to said base, and said second coupling part is coupled to said main pole terminal, with said insulator interposed therebetween; and
two or more cells that are housed in said accommodation space and charged and discharged via said main pole;
wherein said two or more module batteries connected in series are spaced apart.

2. The power storage apparatus according to claim 1, wherein
said main pole terminal includes a first connecting part that has a nickel-plated first surface,
said intrastage wire comprises a flexible conductor comprising a second connecting part and a mesh wire, said second connecting part having a nickel-plated second surface, and
each of said two or more series-connected sets further includes a tightening mechanism for tightening said first connecting part and said second connecting part.

3. The power storage apparatus according to claim 2, further comprising:
a first voltage measuring wire that is coupled to said main pole terminal; and
a second voltage measuring wire that is coupled to said flexible conductor.

4. The power storage apparatus according to claim 2, wherein
said tightening mechanism includes:
a bolt having a bolt length; and
a nut that is screwed on said bolt,
said first connecting part is spaced from said side wall by a first distance, said first distance being longer than said bolt length, and
said main pole terminal further includes a proximity part that is spaced from said side wall by a second distance and coupled to said main pole feedthrough part, said second distance being shorter than said first distance.

5. The power storage apparatus according to claim 3, wherein
said tightening mechanism includes:
a bolt having a bolt length; and
a nut that is screwed on said bolt,
said first connecting part is spaced from said side wall by a first distance, said first distance being longer than said bolt length, and
said main pole terminal further includes a proximity part that is spaced from said side wall by a second distance and coupled to said main pole feedthrough part, said second distance being shorter than said first distance.

6. The power storage apparatus according to claim 1, wherein said main pole terminal comprises a proximity part and a first connecting part that are electrically connected and arranged in an extending direction away from said main pole feedthrough part so as to be in parallel with an outer surface of said side wall, wherein said proximity part and said first connecting part are spaced from the outer surface of said side wall at different distances in a direction perpendicular to the extending direction of said proximity part and said first connecting part.

* * * * *

UNITED STATES PATENT AND TRADEMARK OFFICE
CERTIFICATE OF CORRECTION

PATENT NO.         : 10,541,405 B2
APPLICATION NO.    : 14/639544
DATED              : January 21, 2020
INVENTOR(S)        : Koji Hoshino It is certified that error appears in the above-identified patent and that said Letters Patent is hereby corrected as shown below:

On the Title Page

Applicant, Item (71)
Please change: "Applicant: NGK Inhibitors, Ltd., Nagoya-Shi (JP)"
To: -- Applicant: NGK Insulators, Ltd., Nagoya-Shi (JP) --

Signed and Sealed this
Twenty-fourth Day of March, 2020

Andrei Iancu
*Director of the United States Patent and Trademark Office*